J. A. & G. S. MOORE.
TRANSMISSION MECHANISM.
APPLICATION FILED APR. 19, 1911.
1,049,756.
Patented Jan. 7, 1913.
2 SHEETS—SHEET 1.
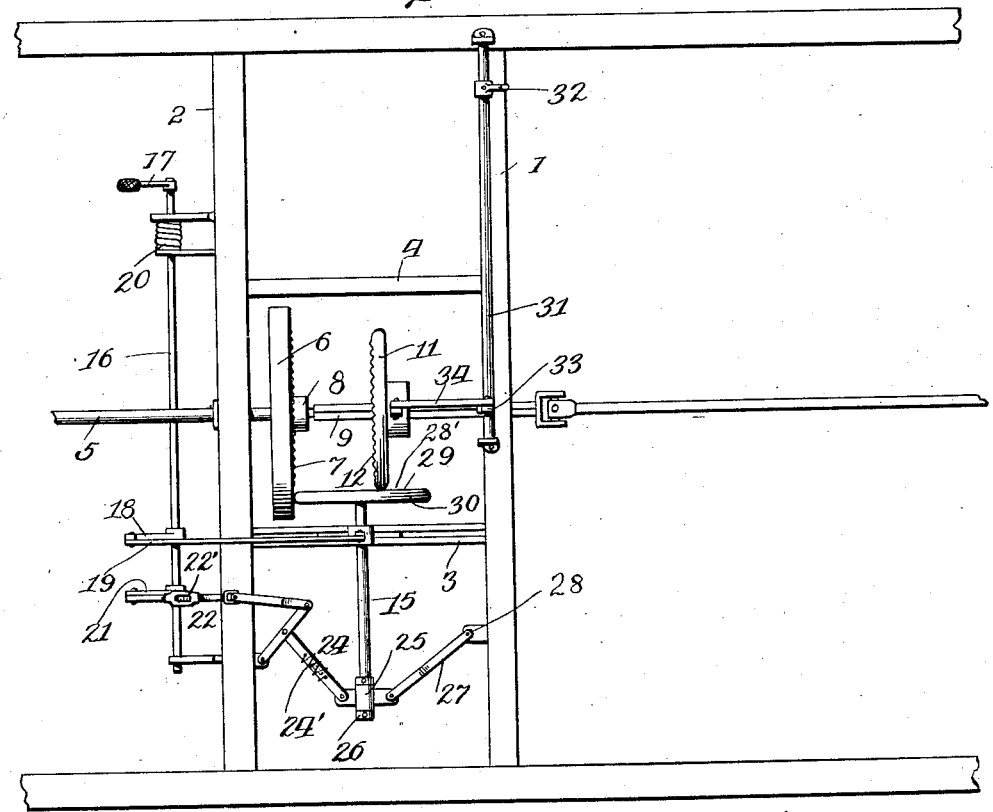
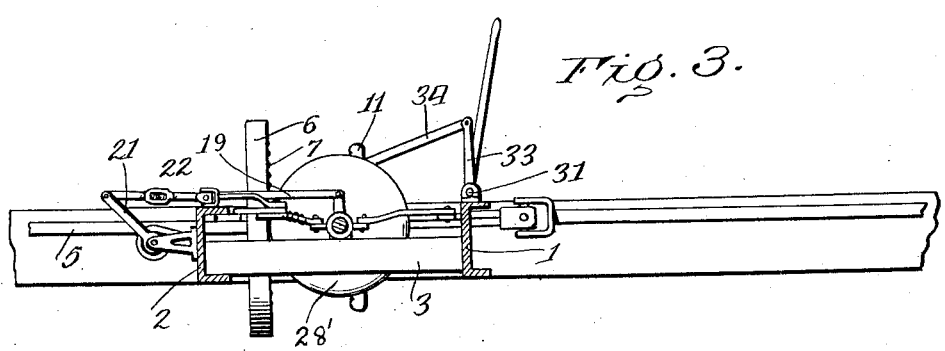
Witnesses
Inventors
J. A. Moore
G. S. Moore
Attorneys

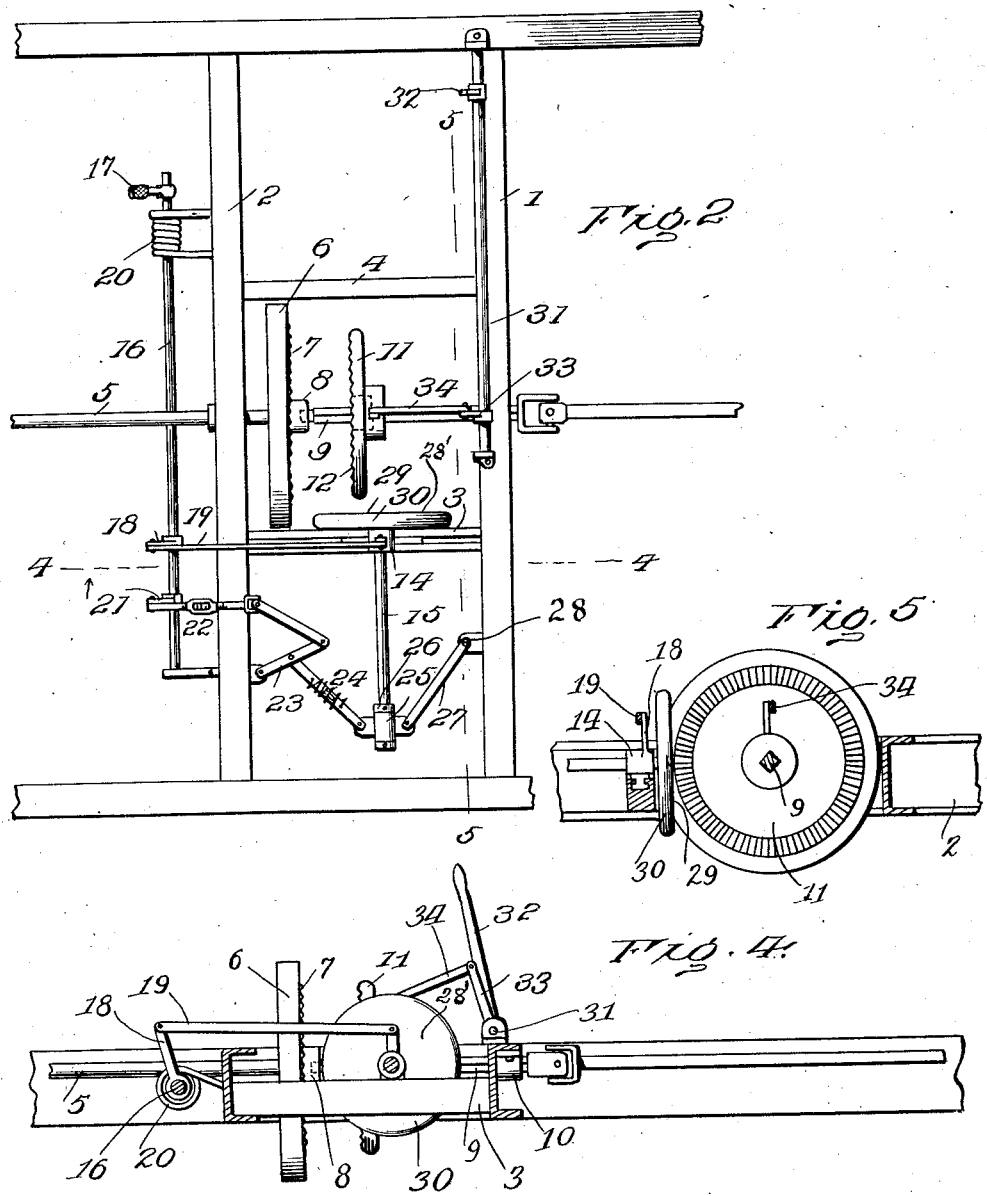

UNITED STATES PATENT OFFICE.

JOHN A. MOORE AND GEORGE S. MOORE, OF HOPE, INDIANA.

TRANSMISSION MECHANISM.

1,049,756.  Specification of Letters Patent.  Patented Jan. 7, 1913.

Application filed April 19, 1911. Serial No. 622,155.

*To all whom it may concern:*

Be it known that we, JOHN A. MOORE and GEORGE S. MOORE, citizens of the United States, residing at Hope, in the county of Bartholomew and State of Indiana, have invented certain new and useful Improvements in Transmission Mechanism, of which the following is a specification.

It is the object of the present invention to provide an improved power transmission mechanism for motor driven vehicles, and the invention aims primarily to provide transmission mechanism of this type which may be readily controlled to transmit power to the drive axle for forward or reverse drive at different speeds and to secure a direct drive from the power shaft.

The invention contemplates that when the transmission shaft of the mechanism is under direct drive from the power shaft, the friction drive, which ordinarily serves to connect the power and transmission shafts, will be inoperative.

For a full understanding of the invention reference is to be had to the following description and accompanying drawings, in which:

Figure 1 is a plan view of the transmission mechanism embodying the present invention, the same being shown in condition for the transmission of power indirectly from the power to the transmission shaft; Fig. 2 is a similar view, illustrating the mechanism in condition for the direct transmission of power from the power to the transmission shaft; Fig. 3 is a side elevation of the mechanism, parts being broken away; Fig. 4 is a vertical longitudinal sectional view on the line 4—4 of Fig. 2, showing in full lines the position of the parts when the mechanism is in condition for the transmission of power indirectly from the power to the transmission shaft, and in dotted lines the position of the parts when the mechanism is in condition for the direct transmission of power from the power to the transmission shaft; Fig. 5 is a transverse sectional view on the line 5—5 of Fig. 2.

Corresponding and like parts are referred to in the following description and indicated in all the views of the accompanying drawings by the same reference characters.

In the drawings, there is shown so much of the frame of the vehicle, upon which the mechanism is mounted, as is necessary to an understanding of the invention, and this frame includes a transverse beam 1, a beam 2 which is located in advance of the beam 1, and beams 3 and 4 which extend between the beams 1 and 2.

The power shaft of the mechanism is indicated by the numeral 5 and is driven in the usual manner and is journaled in a bearing upon the beam 2. Fixed upon the power shaft, at its rear end, is a friction wheel 6 having a clutch face 7, presented rearwardly. A bearing 8 is located at the center of the clutch face 7 and loosely receives the forward end of the transmission shaft 9 of the mechanism, this shaft being also journaled in a bearing 10 upon the beam 1. Fixed upon the transmission shaft 9 for rotation therewith, but for sliding movement longitudinally thereof, is a friction wheel 11 having a forwardly presented friction face 12 designed to coöperate with the clutch face 7 of the wheel 6. The wheel 11 is provided with a friction rim 13, the purpose of which will be hereinafter explained.

Mounted for sliding movement upon the beam 3 is a bearing 14 in which is journaled a shaft 15 counter to the transmission shaft 9, the shaft 15 being slidable in its bearing in the direction of its length.

Mounted in advance of the beam 2 is a rock shaft 16 which may be oscillated through the medium of a foot pedal 17 fixed at one end thereof. An arm 18 is fixed upon the shaft 16, and pivoted to this arm and to the bearing 14 is a rod 19. It will be readily understood that oscillation of the shaft 16 will result in a forward or rearward sliding movement of the bearing 14, a spring 20 being preferably connected with the rock shaft 16 to normally hold the same rocked in a direction to position the bearing 14 at the rear limit of its movement. The shaft 16 also carries an arm 21 to which is pivoted the forward end of a rod 22. The rod 22 is pivoted at its rear end to an arm 23 mounted to rock upon the beam 2, and a rod 24 is pivoted to the arm 23 and has pivotal connection with a collar 25 which is loosely fitted between collars 26 fixed upon the shaft 15. A rod 27 is connected in a similar manner, at its forward end, to the collar 25, and at its rear end is pivoted, as at 28, to the beam 1. At this point it will be readily understood that when the shaft 16 is rocked against the tension of the spring 20, the bearing 14 will be slid forwardly upon the beam 3 and the shaft 15 will be slid longitudinally in the bearing 14 toward the transmission shaft 9.

A friction wheel 28' is fixed upon the counter shaft 15 at its inner end and has a friction face 29 presented inwardly, and is also provided with a friction rim 30 designed to coöperate with the face of the friction wheel 6. When the shaft 16 is rocked, as stated above, the rim 30 of the friction wheel 28' will be brought into engagement with the face of the friction wheel 6, owing to the forward sliding movement of the bearing 14, and, simultaneously, the friction face of the wheel 28' will be brought into engagement with the friction rim 13 of the friction wheel 11. Power is at such time transmitted, indirectly, from the power to the transmission shaft.

A rock shaft 31 is mounted upon the beam 1 and is operable through the medium of a hand lever 32 fixed at one end thereof and this shaft 31 carries an arm 33 which is connected by means of a rod 34 with the hub of the friction wheel 11. By rocking the lever 32 forwardly or rearwardly the friction wheel 11 will be correspondingly shifted upon the transmission shaft 9 and, if the shaft 16 has been rocked to bring the wheel 28' into frictional engagement with the wheels 6 and 11, the speed and direction of rotation of the transmission shaft may be governed at will. Should it be desired to secure a direct drive between the power and transmission shafts, the lever 32 is rocked forwardly until the friction wheel 11 has its clutch face 12 brought into engagement with the clutch face 7 of the wheel 6, whereupon the shaft 16 is released and is returned by the spring 20 to normal position, thus moving the wheel 28' out of engagement with the wheels 6 and 11.

It will be understood of course that the friction wheel 6 may be the ordinary fly wheel of the engine or it may be a separate and distinct element. It will also be readily understood that if desired two of the friction wheels 28' may be provided, the additional one being of course located opposite the one shown in the drawings, this construction being desirable when the mechanism is to be installed upon a heavy vehicle.

It is preferable that a turnbuckle 22' be interposed in the length of the rod 22 so that this rod may be adjusted as regards its length, and that the rod 24 be formed in two sections normally held against separation by a spring 24', the spring performing also the function of holding the friction wheel 29 firmly in place against the wheels 6 and 11 when the foot pedal 17 is depressed.

Having thus described the invention, what is claimed as new is:—

1. In power transmission mechanism, a power shaft, a friction wheel fixed thereon, a transmission shaft, a friction wheel mounted thereon for rotation therewith and for sliding movement toward and from the friction wheel upon the power shaft, a slidable bearing arranged to move parallel to the transmission shaft, a countershaft journaled in the bearing and slidable longitudinally therein, a friction wheel fixed upon the countershaft and arranged to have its rim brought into engagement with the face of the friction wheel upon the power shaft when the bearing is slid in the direction of the said friction wheel upon the power shaft and to have its face brought into engagement with the rim of the friction wheel upon the transmission shaft when the countershaft is slid in its bearing in the direction of the transmission shaft, a manually operable shaft, an arm upon the shaft, a rod connecting the arm and the bearing for the countershaft, a second arm upon the manually operable shaft, connection between the last mentioned arm and the countershaft for shifting the latter in its bearing when the manually operable shaft is rocked, the friction wheels upon the power and transmission shafts having coöperating clutch faces, and means for shifting the friction wheel upon the transmission shaft into clutching engagement with the friction wheel upon the power shaft.

2. In power transmission mechanism, a power shaft, a friction wheel fixed thereon, a transmission shaft, a friction wheel mounted thereon for rotation therewith and for sliding movement toward and from the friction wheel upon the power-shaft, a slidable bearing arranged to move parallel to the transmission shaft, a counter-shaft journaled in the bearing and slidable longitudinally therein toward and from the friction wheel upon the transmission shaft, a friction wheel fixed upon the counter-shaft and arranged to have its rim brought into engagement with the face of the friction wheel on the power shaft when the bearing is slid in the direction of the said friction wheel on the power shaft and to have its face brought into engagement with the rim of the friction wheel upon the transmission shaft when the counter-shaft is slid in its bearing, a manually operable shaft, connection between the shaft and the bearing for the counter-shaft arranged to slide the said bearing when the said manually operable shaft is rocked, and connection between the manually operable shaft and the counter-shaft arranged to slide the latter in its bearing when said manually operable shaft is rocked.

3. In power transmission mechanism, a power shaft, a friction wheel fixed thereon, a transmission shaft, a friction wheel mounted thereon for rotation therewith and for sliding movement toward and from the friction wheel upon the power shaft, a slidable bearing arranged to move parallel to the transmission shaft, a counter-shaft journaled in the bearing and slidable longitudinally therein toward and from the friction wheel upon the transmission shaft, a friction wheel fixed upon the counter-shaft and arranged to have its rim brought into engagement with the face of the friction wheel upon the power-shaft when the bearing is slid in the direction of said friction wheel upon the power shaft and to have its face brought into engagement with the rim of the friction wheel upon the transmission shaft when the counter-shaft is slid in its bearing, a manually operable shaft, connection between the shaft and the bearing for the counter-shaft arranged to slide the said bearing when the said manually operable shaft is rocked, and yieldable connection between the manually operable shaft and the counter-shaft arranged to slide the counter-shaft in its bearing when the manually operable shaft is rocked.

4. In power transmission mechanism, a power shaft, a friction wheel fixed thereon, a transmission shaft, a friction wheel mounted thereon for rotation therewith and for sliding movement toward and from the friction wheel upon the power shaft, a slidable bearing arranged to move parallel to the transmission shaft, a counter-shaft journaled in the bearing and slidable longitudinally therein toward and from the friction wheel upon the transmission shaft, a friction wheel fixed upon the counter-shaft and arranged to have its rim brought into engagement with the face of the friction wheel upon the power shaft when the bearing is slid in the direction of said friction wheel upon the power shaft and to have its face brought into engagement with the rim of the friction wheel upon the transmission shaft when the counter-shaft is slid in its bearing, a manually operable shaft, connection between the shaft and the bearing for the counter-shaft to slide the said bearing when the said manually operable shaft is rocked, means arranged to normally hold the manually operable shaft in one direction, and yieldable connection between the manually operable shaft and the counter-shaft arranged to slide the counter-shaft in its bearing when the manually operable shaft is rocked.

5. In power transmission mechanism, a power shaft, a friction wheel fixed thereon, a transmission shaft, a friction wheel mounted thereon for rotation therewith and for sliding movement toward and from the friction wheel upon the power shaft, a slidable bearing arranged to move parallel to the transmission shaft, a counter-shaft journaled in the bearing and slidable longitudinally therein toward and from the friction wheel upon the transmission shaft, a friction wheel fixed upon the counter-shaft and arranged to have its rim brought into engagement with the face of the friction wheel upon the power-shaft when the bearing is slid in the direction of said friction wheel upon the power shaft and to have its face brought into engagement with the rim of the friction wheel upon the transmission shaft when the counter-shaft is slid in its bearing, a manually operable shaft, connection between the shaft and the bearing for the countershaft arranged to slide the said bearing when the said manually operable shaft is rocked, a collar upon the counter-shaft, a supporting member pivotally connected to the collar, an arm upon the manually operable shaft, and connection between the arm and the said collar.

6. In power transmission mechanism a power shaft, a friction wheel fixed thereon, a transmission shaft, a friction wheel mounted thereon for rotation therewith and for sliding movement toward and from the friction wheel upon the power shaft, a slidable bearing arranged to move parallel to the transmission shaft, a counter-shaft journaled in the bearing and slidable longitudinally therein toward and from the friction wheel upon the transmission shaft, a friction wheel fixed upon the counter-shaft and arranged to have its rim brought into engagement with the face of the friction wheel upon the power shaft when the bearing is slid in the direction of said friction wheel upon the power shaft and to have its face brought into engagement with the rim of the friction wheel upon the transmission shaft when the counter-shaft is slid in its bearing, a manually operable shaft, connection between the shaft and the bearing for the counter-shaft arranged to slide the said bearing when the said manually operable shaft is rocked, a collar upon the counter-shaft, a supporting member pivotally connected to the collar, an arm upon the manually operable shaft, and flexible connection between the arm and the said collar.

In testimony whereof, we affix our signatures in presence of two witnesses.

JOHN A. MOORE.
GEORGE S. MOORE.

Witnesses:
J. OTIS SNIDER,
JAMES R. DAVIS.